Aug. 16, 1955  C. G. JONES  2,715,544
ARMREST FOR VEHICLE DOORS
Filed Jan. 10, 1955
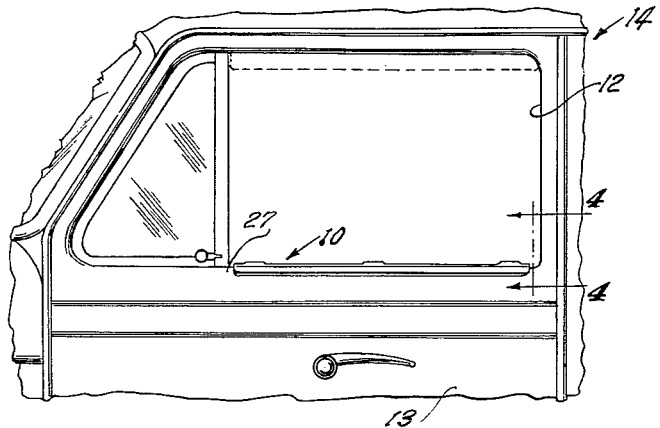
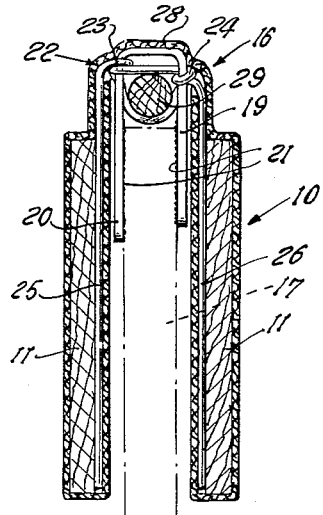
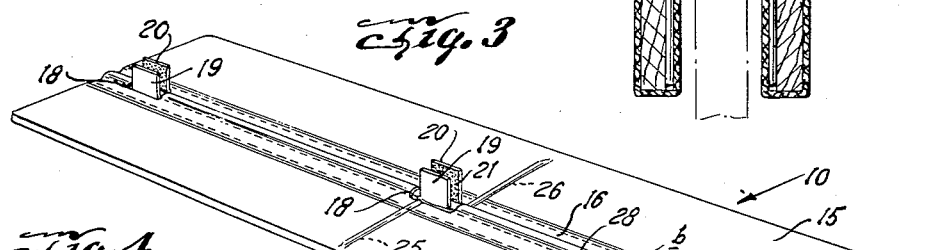
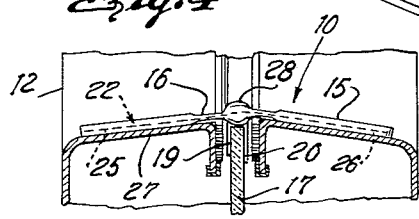
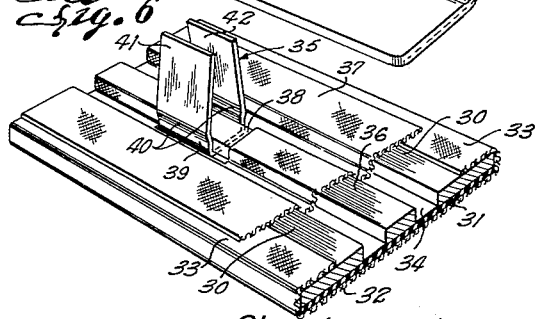
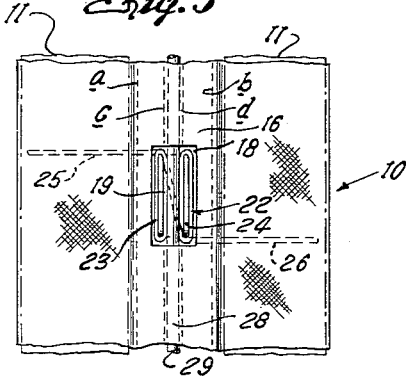
Chester G. Jones
INVENTOR
BY
ATTORNEY

2,715,544
ARMREST FOR VEHICLE DOORS

Chester G. Jones, Dallas, Tex.

Application January 10, 1955, Serial No. 480,639

8 Claims. (Cl. 296—49.2)

This invention relates to accessories for automobiles and more particularly to an improvement in arm rests for vehicle doors.

The principal object of the invention is to provide an armrest for vehicle doors which is at once inexpensive, attractive and highly effective to shield the arm against the discomfort usually experienced because of the heat of the sun absorbed by the metal sill on which the arm is sometimes rested while driving the vehicle.

Broadly, the invention seeks to improve upon the more complicated armrests and to this end, it consists of a flat, elongate body composed of parallel strips of a suitable stiffening material, such as balsa wood, encased in a covering of fabric or other materials of low heat radiating qualities, the said covering flexibly joining the said strips in spaced apart relationship to define a longitudinal intermediate flexible portion to which is attached, in longitudinally spaced relationship a plurality of clips for clamping engagement with the top edge of the glass in the opening of an automobile door, the said flexible portion being receivable in the glass channel at the top of said opening in raised position of the glass while the stiffened sides of the armrest, being normally extended by resilient means outwardly from the glass, overlie the metal sill of the opening when the glass is lowered to shield the arm of the automobile occupant against uncomfortable temperatures of the window sill.

Other objects will appear as the description proceeds when considered with the annexed drawing, wherein:

Figure 1 is a fragmentary side elevational view of an automobile showing the invention installed.

Figure 2 is a vertical sectional view of the invention on a larger scale, showing its collapsed position on the glass of the door opening for reception in the upper glass channel in raised position of the glass.

Figure 3 is a perspective view of the underside of the armrest.

Figure 4 is a vertical sectional view taken on line 4—4 of Figure 1.

Figure 5 is a fragmentary view of the underside of the armrest showing the midsection thereof to reveal the spring means which normally holds the stiffened side portions thereof extended, and Figure 6 is a perspective view fragmentarily showing a modification of the invention in inverted position.

Continuing with a more detailed description of the drawing, numeral 10 generally denotes the armrest of the invention which is comprised of a pair of coextensive stiffening members 11, preferably balsa wood but which can be any material suitable for the purpose which will not radiate heat.

The stiffening strips 11 are preferably flat and of such length as to extend substantially the width of the opening 12 in the door 13 of the vehicle 14. A covering 15 of fabric or other material having low heat radiating characteristics is preformed to encase the strips 11 in spaced apart, parallel relationship to define therebetween a longitudinal flexible portion 16 which is coextensive with the stiffening members 11.

The flexible intermediate portion 16 is adapted to overlie the top edge of the window glass 17 and the fabric covering 15 is provided with longitudinally spaced cutouts 18 to accommodate clips or clamps 19 which are of substantially U-shape and made from spring steel or other material of equal spring-back qualities. It is to be noted that in each of these clips one leg 20 is longer. This is to facilitate mounting of the clip onto the edge of the glass and it is further pointed out that the glass contacting surfaces of the legs of the clips may be coated with a friction material 21, such as rubber, or roughened, to increase the holding qualities of the clips so that they will not be easily displaced from the glass.

The parts of the armrest on opposite sides of the flexible intermediate portion 16, which may be referred to as wings or flaps, are urged normally toward a plane perpendicular to the glass panel 17 to which the armrest is attached by means of a clip 19. This spring may be formed in any suitable shape but in Figures 2 to 5, the spring is shaped to define two flat loops 23 and 24 intermediate the end portions 25 and 26 of the spring (Figure 5). The loops 23 and 24 embrace the legs of the clips 19 adjacent the bight of the U-shaped body thereof and the ends 25 and 26 of the spring are extended under the fabric covering of the strips 11 on opposite sides of the centrally located clip 19. The spring is preformed as described to provide the required flexibility without fatigue, also in order that its end portions 25 and 26 will insure expansion of the wings of the armrest from their position in Figure 2 to their position in Figures 1, 3, 4 and 5. In other words, the wings, when the glass 17 is raised, assume a vertical plane in relative parallelism and lie flush against the sides of the glass because the flexible intermediate area 16 has been thrust into the top glass channel by the glass itself but when the glass is lowered into the door, the edges of the wings will be extended into a more or less horizontal plane so that they will conform to and lie on the sill 27 on each side of the glass channel as shown in Figures 1 and 4.

There is no prescribed manner in which the elements of the armrest are assembled but one method consists in pre-forming the strips 11 of stiffening material and the fabric covering 15. The covering in blank form is wrapped around the strips 11 while the latter are held in spaced apart parallelism. The fabric is secured as indicated by the dotted lines $a$ and $b$ to define the sides of the flexible intermediate portion 16. Parallel seams $c$ and $d$ between the seams $a$ and $b$ provide an elongate pocket 28 for a longitudinal rib formed by a wire or bamboo stick 29 which is slid into the pocket 28 from one end and which extends between the legs of each clip 19 and over that portion of the spring 22 which is disposed between the legs of the clips. In this manner, both the clips and the springs are held flexibly onto the armrest. It is also obvious that instead of securing the covering 15 by stitching equally good results can be accomplished by fastening the cover in place by means of a water-proof glue.

In the modification shown in Figure 6, the armrest consists of two flat strips 30 of balsa wood or other suitable material which are secured by means of waterproof glue to a sheet 31 of resilient material such as natural or synthetic rubber, the strips 30 being in spaced apart parallelism on the sheet 31 whose longitudinal and latitudinal dimensions equal those of the armrest in its completed form.

After gluing the strips 30 into the resilient sheet 31, a covering 32 of fabric or other suitable material of low heat radiating characteristics is glued to the surface of the resilient sheet 31 opposite the strips 30 and its longitudinal edges 33 are folded over the outer edges of the strips 30 and glued to the bottom surfaces of these strips in the manner shown. Thus is defined between the strips 30 an intermediate flexible area 34.

Two or more spring steel clips 35 are secured to the armrest by means of a rib 36 of hardwood or other suitable material which is coextensive with the strips 30 and is glued to the undersurface of the resilient sheet 31 midway between the confronting edges of the strips 30. First, however, the clips 35, only one being shown, are disposed in the position illustrated and being generally of U-shape, the rib 36 rests in the base of the clip so that while there is a certain amount of flexibility between the clip and armrest, the clip, when fastened to the top edge of the glass panel of an automobile door, the clip will hold the armrest substantially in a plane perpendicular to the glass panel, aided by the rubber sheet 31 which tends to hold the wings of the armrest, composed of the stiffening strips 30, in extended positions.

After securing the clips 35 in the manner described, a lining 37 of fabric or other suitable material is glued to the undersurface of the strips 30 and is rolled or pressed down between the strips 30 and the rib 36 to adhere to the resilient sheet 31 in the space between the strips 30 and the rib 36. The lining 37 has cut-outs 38 to accommodate the clips 35.

Inasmuch as the flexible intermediate portion 34 of the armrest is to be pressed into the top glass channel of a door when the glass is raised, it is preferred that the bight 39 of the clips 35 be reduced in width by forming crimps 40 in the legs 41 and 42 of the clip to reduce their inner spacing to the width of the rib 36 so that the rib and the bights of the clips will be readily received in the glass channel when the glass is raised. Also, since the rib 36 is substantially square in transverse section, the bights of the clips should be made to conform thereto.

When the glass panel is lowered, the resilient sheet 31, which is under tension, will urge the sides or wings of the armrest outwardly away from the sides of the glass and the frictional engagement of the clips 35 with the glass will prevent displacement of the armrest by the wind as the automobile is in motion if it is desired to keep the glass partly open. When the glass is fully lowered, the legs 41 and 42 of the clips will enter the lower glass channel while the armrest will be brought into operative position on the sill of the door window to serve as a protection for the arm of the automobile operator against the uncomfortable temperature of the metal sill.

Manifestly, the construction as shown and described is capable of some modification and such modification as may be construed to fall within the scope and meaning of the appended claims is also considered to be within the spirit and intent of the invention.

What is claimed is:

1. An armrest for automobile windows comprising a body composed of elongate flat strips of non-metallic material in spaced apart parallelism, a cover of flexible material of low heat radiating qualities encasing said strips and defining therebetween a flexible area coextensive with said strips, a plurality of clips flexibly attached to said flexible area in longitudinally spaced relationship and adapted to clampingly engage the top edge of the glass of said window, said strips and enclosing fabric defining wings adapted to lie one on each side of said glass in lowered position of the latter in said window.

2. In an armrest for automobile windows having a glass panel slidable in channels in said window, an elongate body composed of flat, elongate stiffening members in coextensive parallelism, defining wings, a fabric cover encasing said members in spaced apart relationship and defining therebetween a longitudinal flexible area, a plurality of clips attached to said flexible area in longitudinally spaced relationship and adapted to clampingly engage the top edge of said glass panel, said wings being adapted to lie flush against the sill of said window in lowered position of said glass panel, said flexible area being receivable by the glass channel in the top of said window when said panel is in fully raised position.

3. The structure of claim 2, and resilient means normally urging the wings of said armrest toward a plane perpendicular to that of said glass panel.

4. The structure of claim 3 in which said clips are of substantially U-shape and whose legs are coated with a friction material for adherence to said glass panel.

5. In an armrest for an automobile window having channels for a slidable glass panel, a substantially flat elongate body having semi-flexible and coextensive wings in longitudinally spaced apart parallelism and an intermediate and coextensive portion forming a flexible area adapted to overlie the top edge of said glass panel and means for detachably securing said flexible area of said body to said glass panel to be thrust thereby into the top channel and said window in raised position of said panel and whereby said wings will be extended to overlie the sill of said window in lowered position of said panel.

6. The structure of claim 5, and resilient means normally biasing said wings outwardly from the sides of said glass panel.

7. The structure of claim 6 in which the means for securing the portion forming said flexible area of said body to said glass panel consists of a plurality of substantially U-shaped spring clips frictionally engaging said panel.

8. The structure of claim 7, and a longitudinally coextensive rib extending through the portion forming said flexible area for holding said spring clips onto said portion.

References Cited in the file of this patent
UNITED STATES PATENTS

| | | |
|---|---|---|
| 1,382,054 | Blair | June 21, 1921 |
| 1,873,190 | Doller | Aug. 23, 1932 |
| 2,586,631 | Esch | Feb. 19, 1952 |